March 22, 1932. F. C. BIGGERT, JR., ET AL 1,850,312
REEL
Filed Dec. 12, 1928 11 Sheets-Sheet 1

INVENTORS

March 22, 1932. F. C. BIGGERT, JR., ET AL 1,850,312
REEL
Filed Dec. 12, 1928 11 Sheets-Sheet 7

INVENTORS

March 22, 1932. F. C. BIGGERT, JR., ET AL 1,850,312
REEL
Filed Dec. 12, 1928 11 Sheets-Sheet 8

INVENTORS

March 22, 1932. F. C. BIGGERT, JR., ET AL 1,850,312
REEL
Filed Dec. 12, 1928 11 Sheets-Sheet 10

March 22, 1932.  F. C. BIGGERT, JR., ET AL  1,850,312

REEL

Filed Dec. 12, 1928  11 Sheets-Sheet 11

INVENTORS

Patented Mar. 22, 1932

1,850,312

UNITED STATES PATENT OFFICE

FLORENCE C. BIGGERT, JR., OF CRAFTON, LANE JOHNSON, OF INGRAM, AND HOWARD H. TALBOT, OF PITTSBURGH, PENNSYLVANIA, ASSIGNORS TO UNITED ENGINEERING & FOUNDRY COMPANY, OF PITTSBURGH, PENNSYLVANIA, A CORPORATION OF PENNSYLVANIA

REEL

Application filed December 12, 1928. Serial No. 325,412.

Our invention relates to reels and more particularly to reels for coiling strip or other metallic material.

In the patent to Johnson No. 1,462,411, July 17, 1923, there is shown and described a method and apparatus for coiling strip material by introducing an end of the strip into an opening defined by a plurality of rollers and guides. The rollers and guides serve to deflect the leading end of a strip of material and cause it to complete a convolution of a coil. Succeeding external convolutions are formed as the strip is fed into the reel. The rollers and guides are yieldingly mounted in order that they may move outwardly as the diameter of the coil increases. Means are provided for positively driving the several rollers.

In the patent to Biggert No. 1,492,954, May 6, 1924, a reel or coiling device is shown in which the rollers and guides are used in connection with a collapsible mandrel for discharging the finished coil. In the structure of this patent as well as in the structure of the Johnson Patent No. 1,654,541, January 3, 1928, a portion of the frame carrying the rollers and guides is positively rotated at the end of the coiling operation to free the coiling rollers from the outer convolution of the coil in order to discharge the coil from the reel. In the last-mentioned Johnson patent a tension spring is provided for urging the rollers inwardly toward the mandrel upon which the coil is wound. In the several patents pinch rollers and guiding means are provided for feeding the strip into the reel.

We provide a reel in which the coil is formed independently of a mandrel and by utilizing rollers and guides in a manner in accordance with certain of the features of the Johnson Patent No. 1,462,411. For discharging the formed coil, we provide means, in addition to the means permitting the outward movement of the rollers due to the increase in the diameter of the coil, for moving or spreading the supports for the rollers outwardly and away from the outer convolution of the completed coil. This movement permits the coil to be deposited on a tubular support disposed within the area defined by the retracted positions. After the coil is deposited on the support an ejector or kick-off device is actuated to move the coil longitudinally of the support and discharge it outside of the reel.

Separate motors mounted on the supports are utilized for certain of the coiling rollers whereby the motors move with the rollers which construction does away with complicated driving shafts involving one or more joints in order to permit the movement of the rollers relative to the frame. The operating devices and ejector are also provided with separate motor drives. Controllers in electrical connection with the several motors are provided for initiating and stopping the several operations of the different portions of the reel.

Movement of the spreading device is initiated by the completion of an electric circuit including the material being supplied to the reel as the material enters the reel. The spreading device is moved at one speed during the coiling operation. At the end of the coiling operation the spreading device is run at a higher speed in order to permit the deposit of the coil on the support. After the coil is discharged from the support the spreading device is rotated in a reverse direction to return the rollers to their retracted positions. As the several operations of the reel are controlled electrically by a single operator it is possible to operate the reel at a high speed. The reel is capable of handling a strip ⅛th inch thick traveling at the rate of 1000 feet per minute. The provision of a direct ejector adds materially in speeding up the operation of the reel.

Certain other advantages and structural features of the invention are hereinafter more fully described. While we have illustrated and described our invention in connection with a reel, it is to be understood that certain of the features may be applied to other forms of metal work machinery within the scope of the invention.

The accompanying drawings illustrate the present preferred embodiment of the invention, in which Figure 1 is a plan view of a reel embodying our invention;

Figure 10:
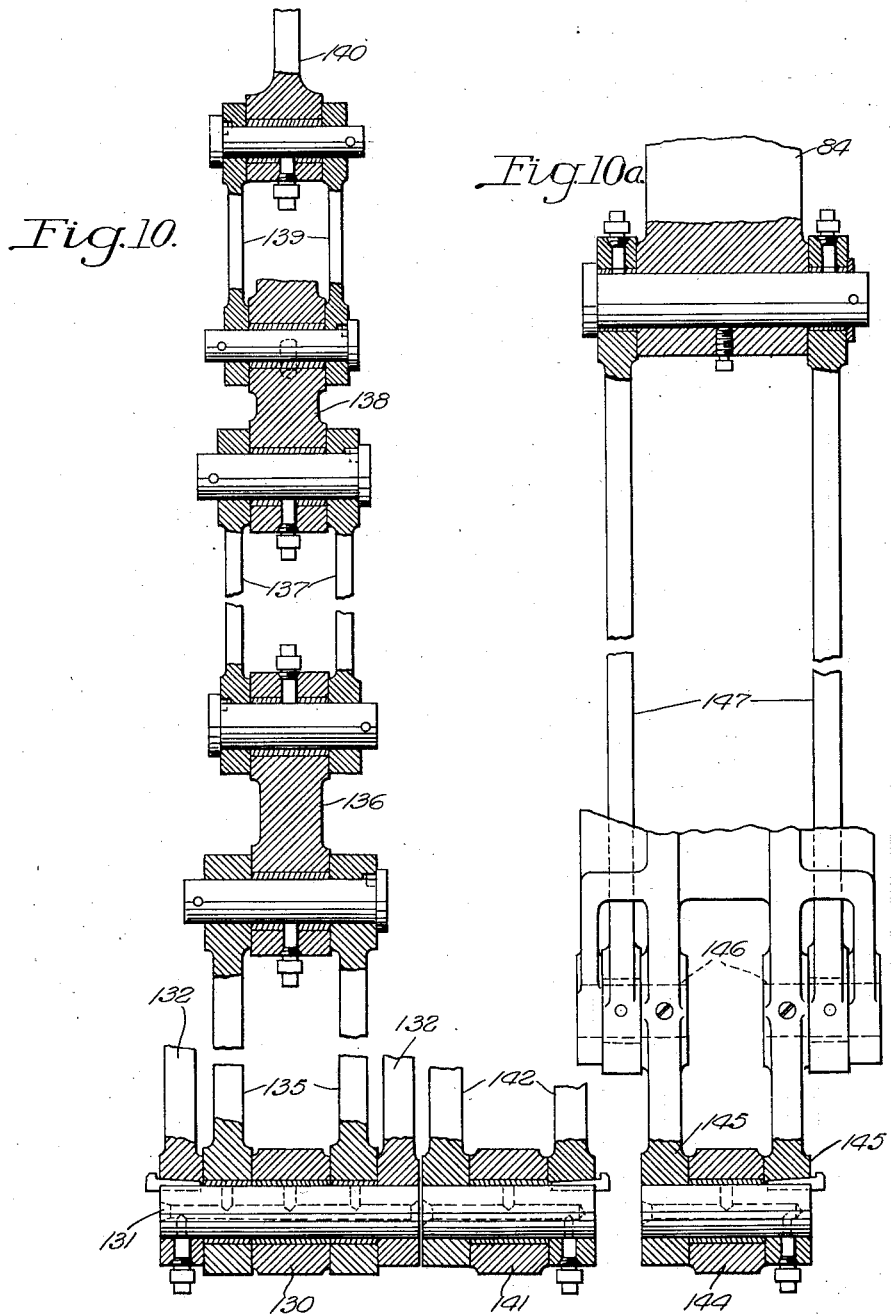
Figure 10 is a development of the link mechanism for spreading part of the coiling rollers.
Figure 11:
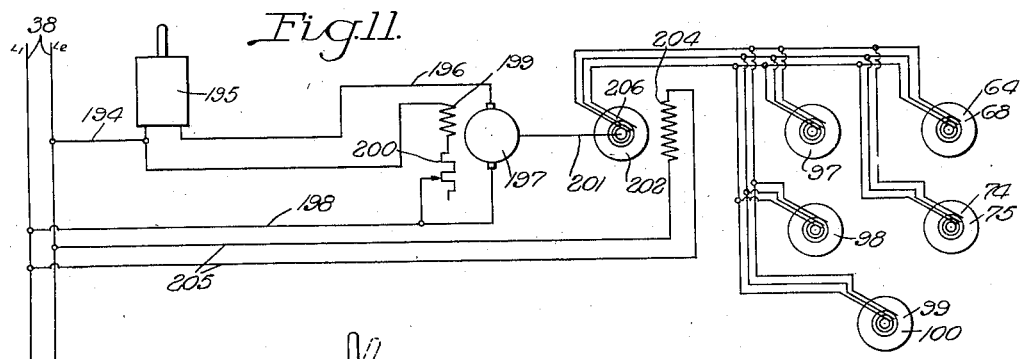
Figure 12:
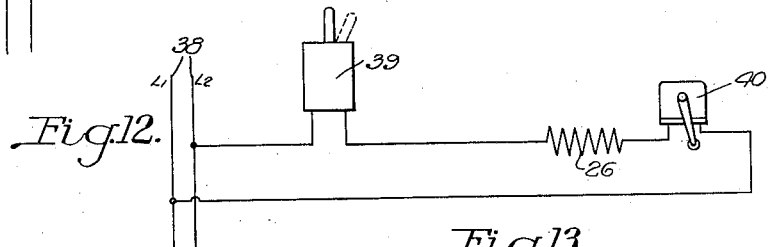
Figure 13:
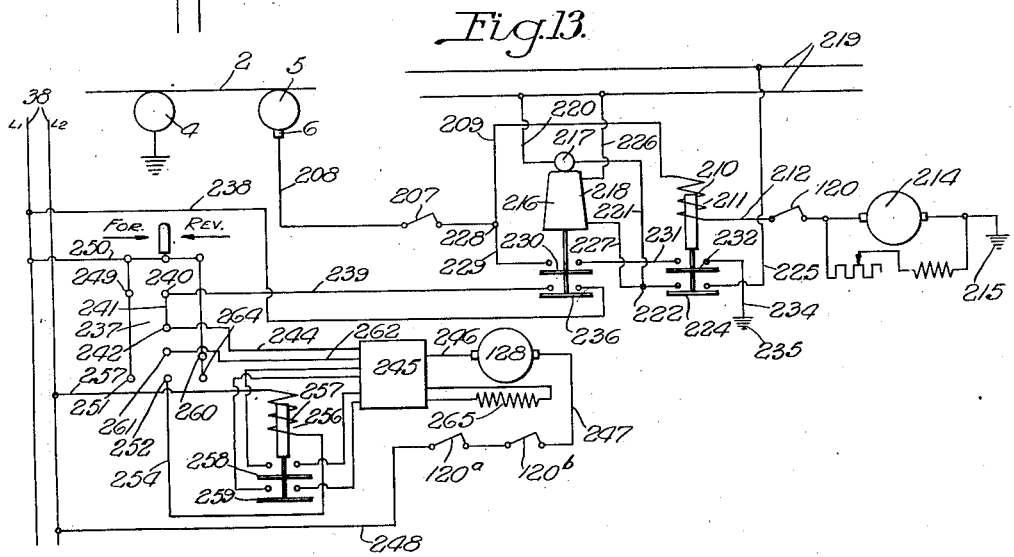
Figure 14:
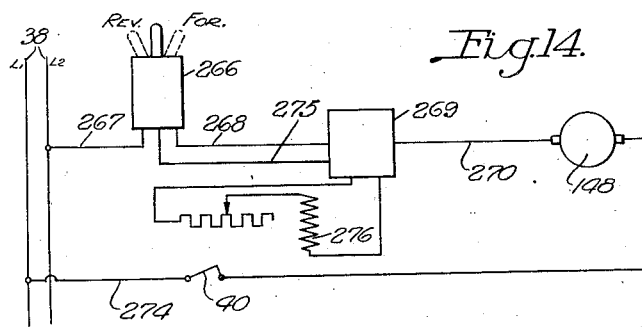

Figure 10—a is a similar view of the link mechanism for spreading another coiling roller;

Figure 11 is a diagrammatic view of circuits and apparatus showing the electrical connections for controlling the rotation of the coiling rollers;

Figure 12 is a similar view of circuits and apparatus for controlling the movement of a solenoid actuating the material feeding gate;

Figure 13 is a similar view of circuits and apparatus for controlling the movement of the motor for actuating the spreading mechanism, and;

Figure 14 is a similar view of circuits and apparatus for controlling the ejector motor.

Figure 4:
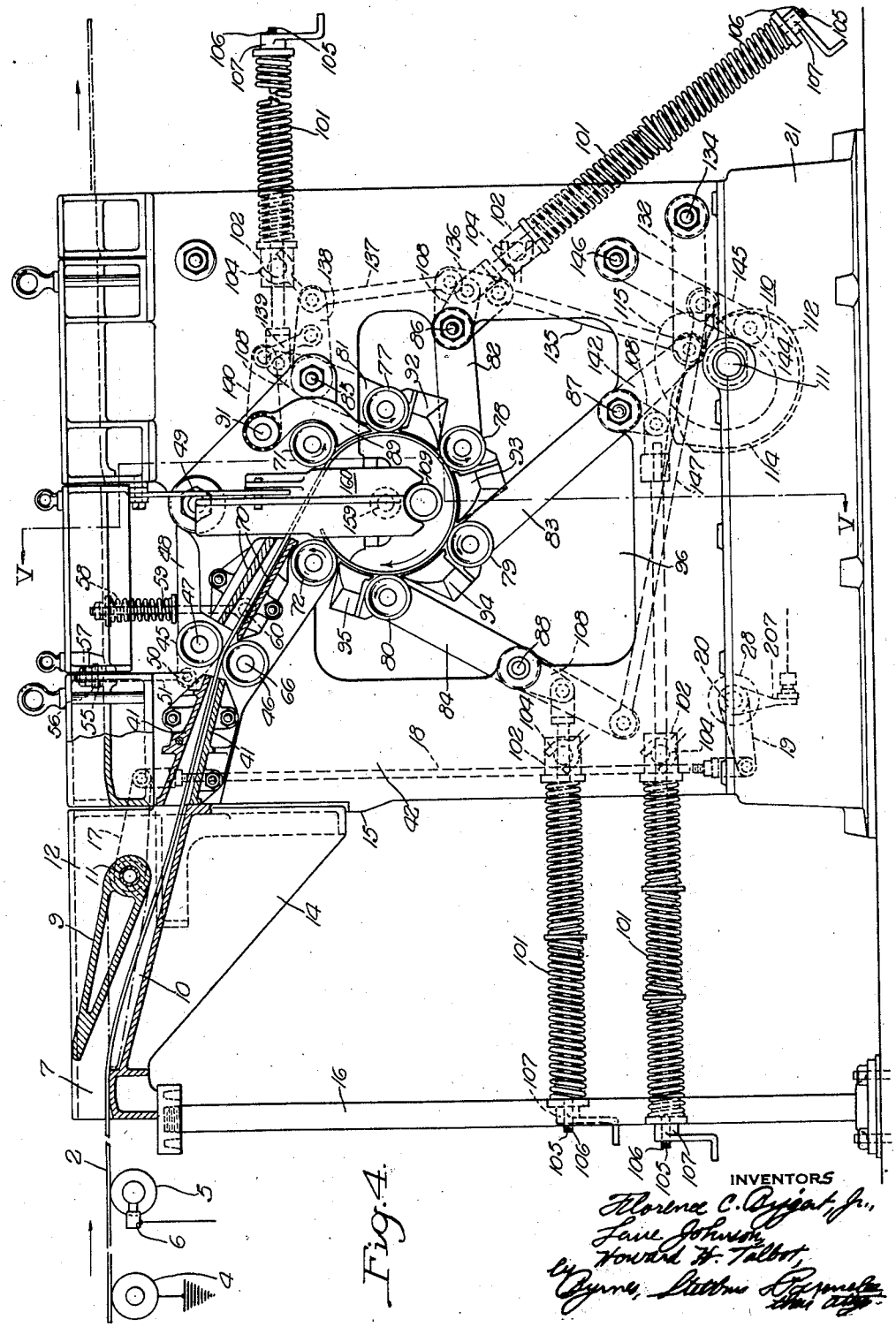
Figure 4 is a front elevational view of the reel with parts of the guiding mechanism broken away.

Referring to Figure 4, strip material 2 which is to be reeled is fed from any source, such as a rolling mill, through a series of guiding means to a conveying roller 4 electrically connected to ground and a conveying roller 5 provided with a terminal 6 for connection to a source of electromotive force hereinafter described. From the roller 5 the strip enters a guideway 7 formed in the top of a reel 8. If the strip is to be coiled in the reel 8, a gate 9 mounted in the guideway 7 is actuated to open and divert the strip into a chute 10 leading to the reeling means. If it is desired to pass the strip onto another reel the gate 9 remains closed.

Figure 1:
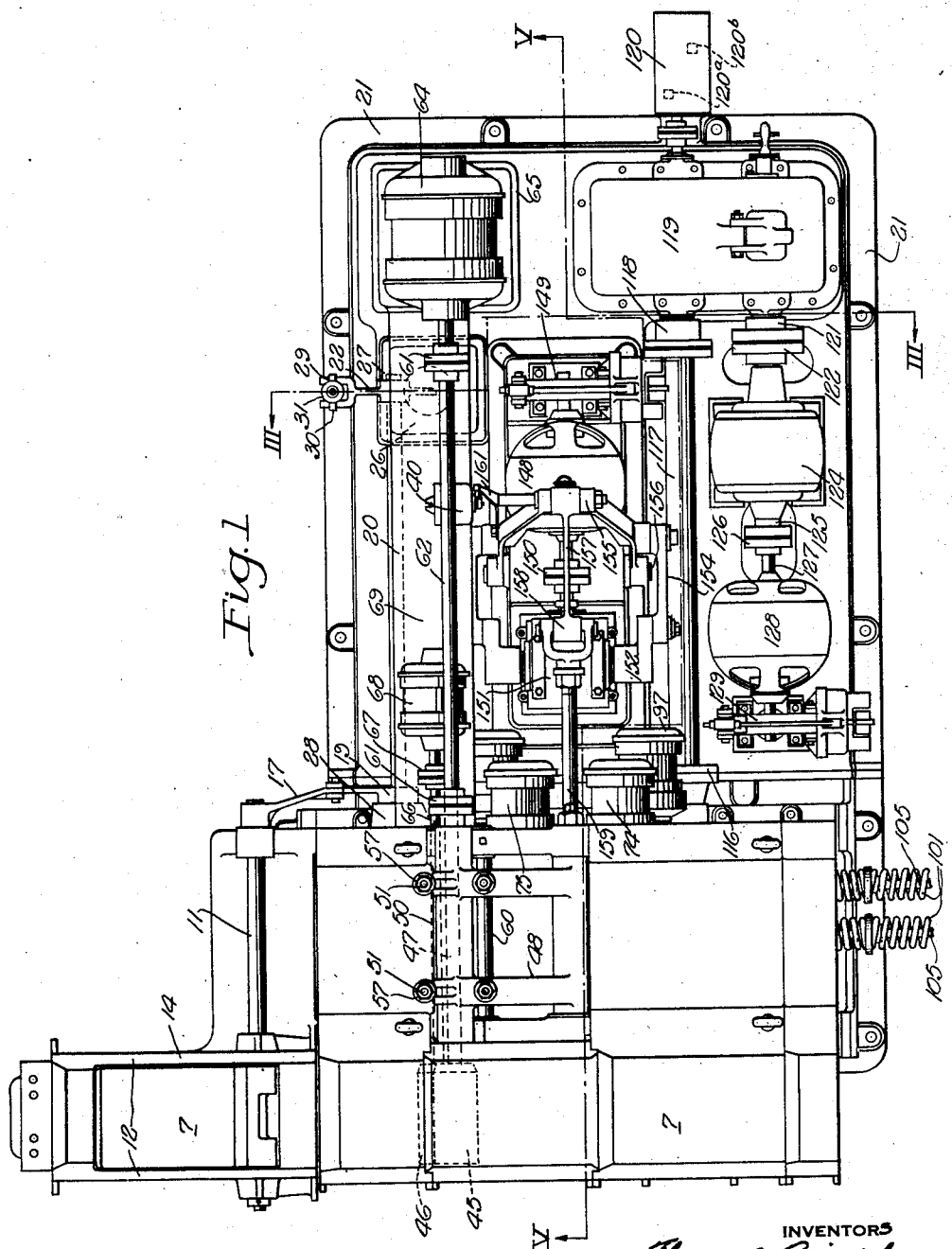
Figure 2:
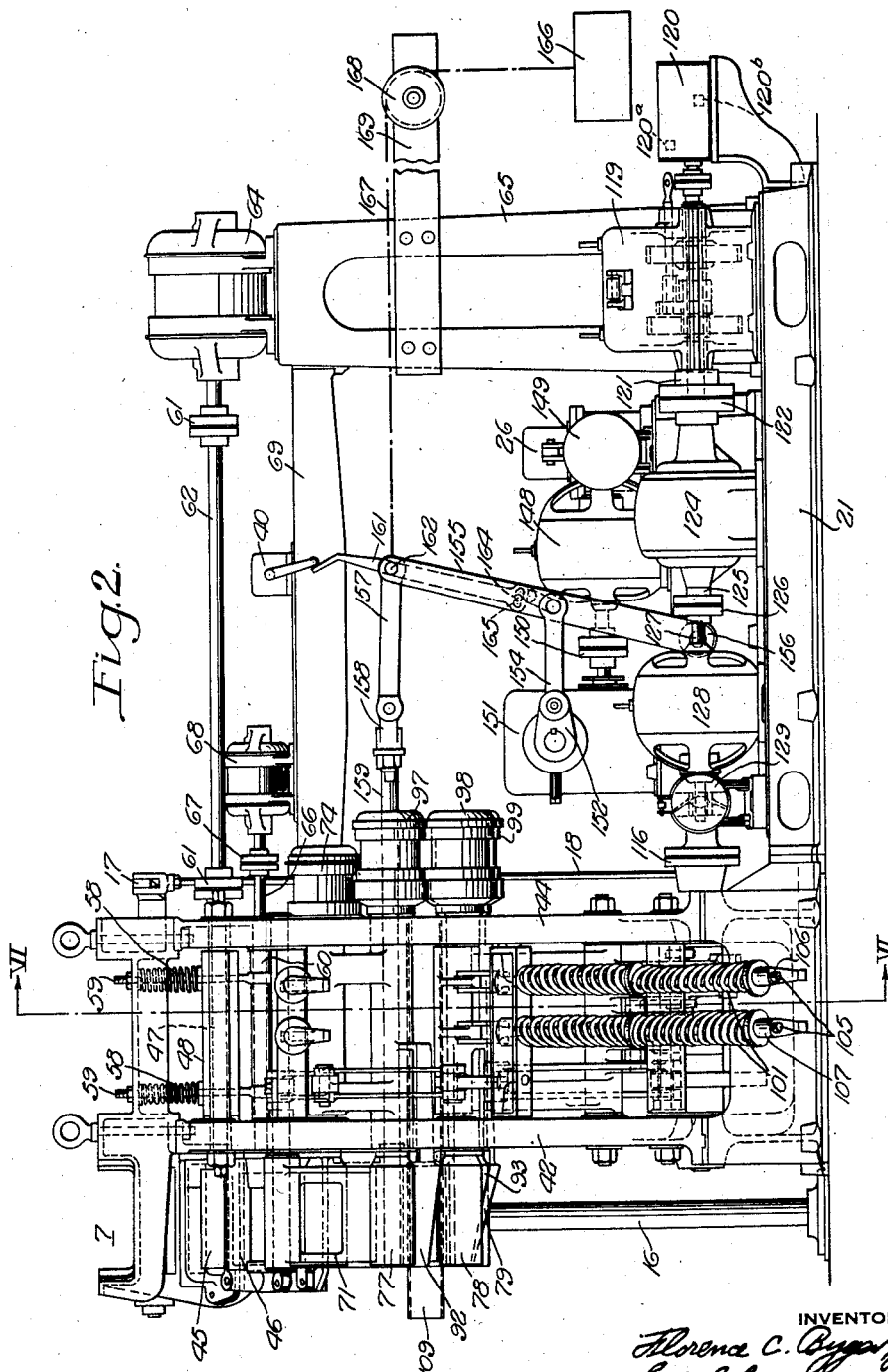
Figure 2 is a side elevational view of the reel.
Figure 3:
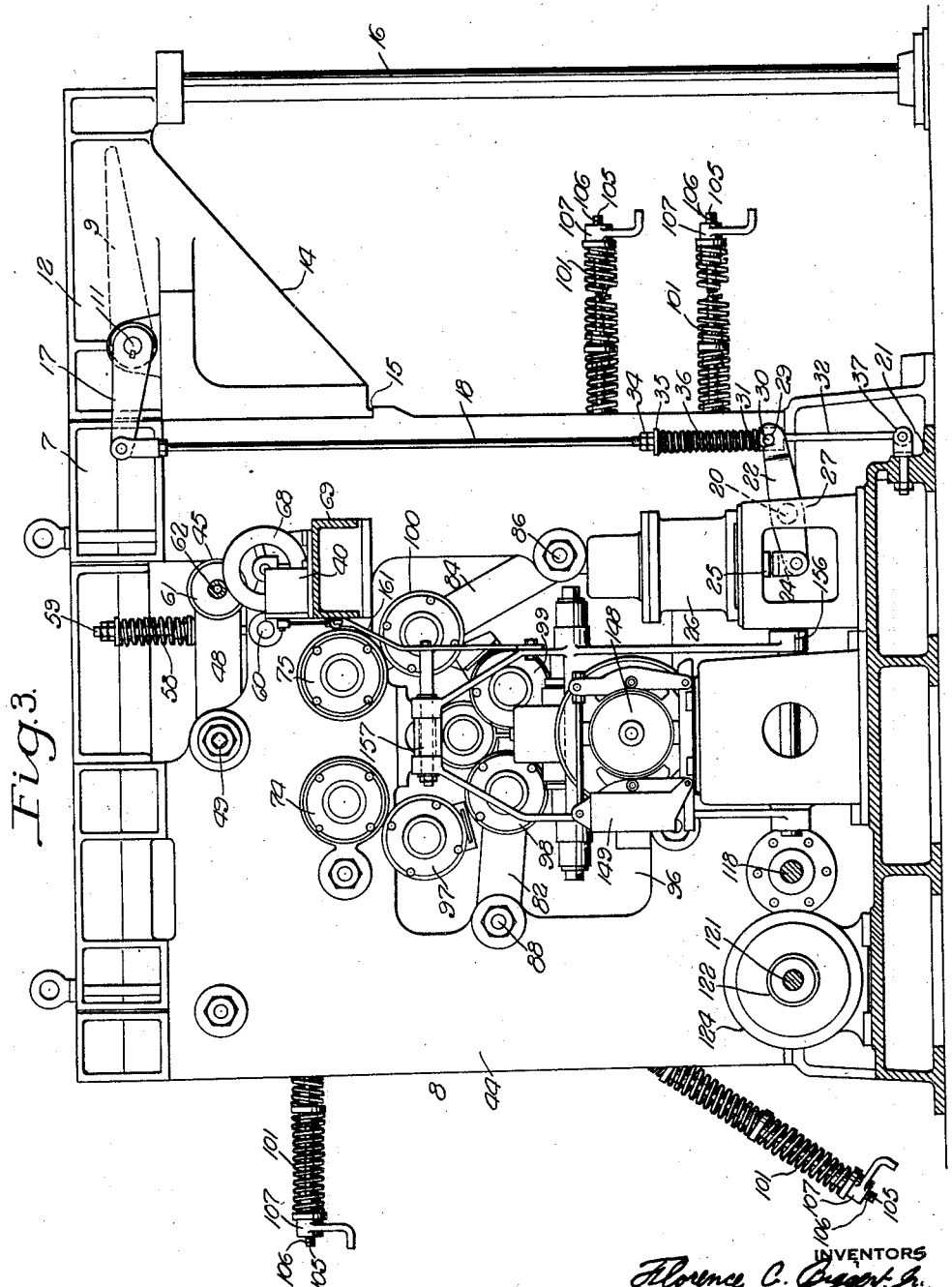
Figure 3 is a transverse sectional view of the reel, taken substantially on the section line III—III of Figure 1.
Figure 6:
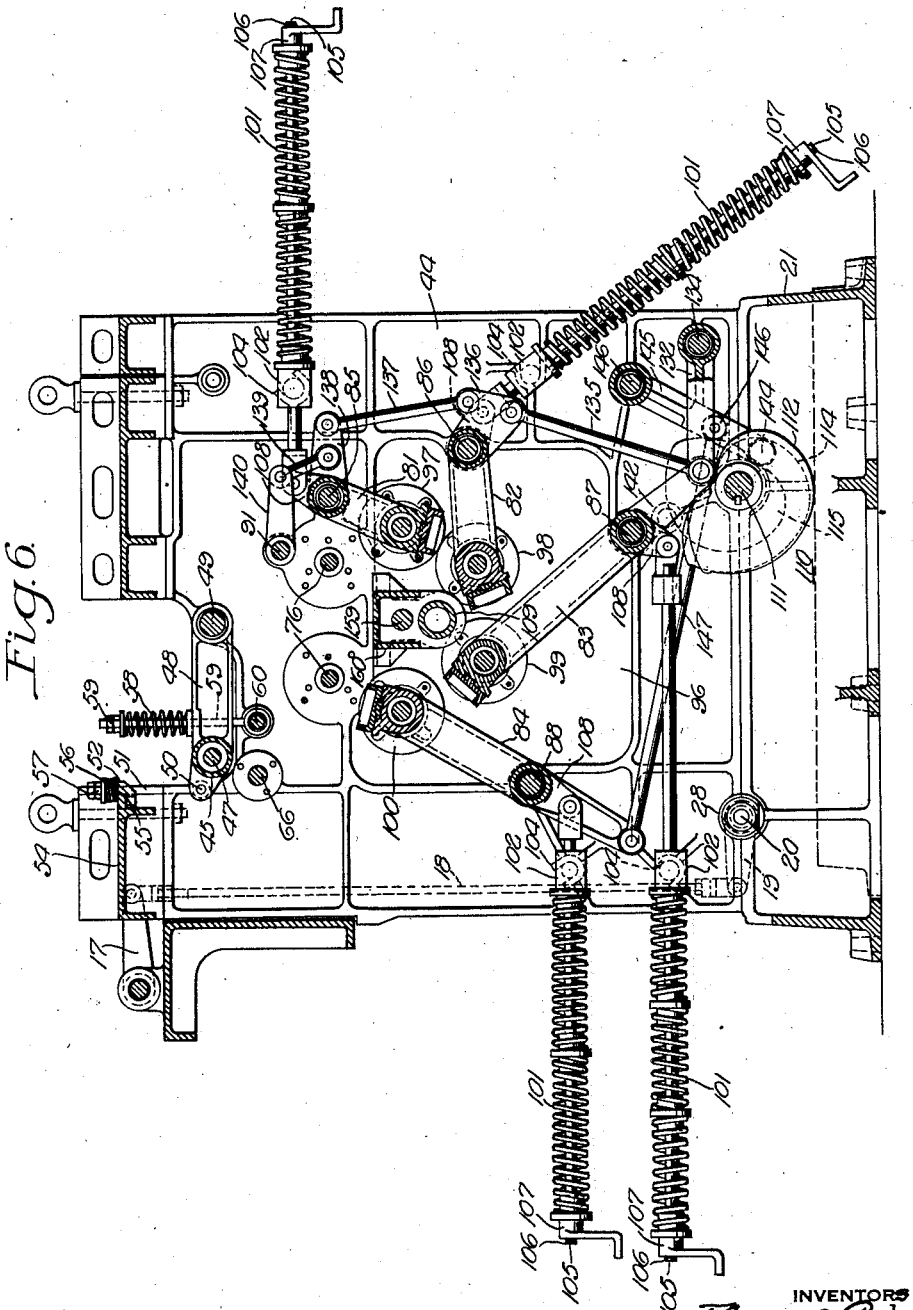
Figure 6 is a transverse sectional view of the reel taken substantially along the section line VI—VI of Figure 2.

The gate 9 is mounted on a shaft 11 extending between the side plates 12 of a feeding device 14 resting on lugs 15 extending outwardly from the frame of the reel 8 and on pedestals 16. The shaft 11 is provided with a lever 17 for rotating it. A pull rod 18, shown particularly in Figures 3 and 6, is pivotally connected to the end of the lever 17 for depressing the lever to raise the gate 9. The lower end of the pull rod 18 is connected to an arm 19 mounted on a shaft 20. The shaft 20 extends longitudinally of a base casting 21 for the reel. The other end of the shaft 20 is provided with a lever 22, one end of which is connected to a coupling device 24 attached to the lower end of an armature 25 of a solenoid 26. The end of the shaft 20 adjacent to the lever 22 is supported in a bearing 27 formed in the supporting frame for the electromagnet 26. The other end of the shaft is provided with a bearing in a boss 28 formed in the base 21.

The outer end of the lever 22 is provided with a notch 29 that bears against trunnions 30 carried by a block 31 slidable along a rod 32. The upper end of the rod 32 is provided with a lock nut 34 and collar 35 for compressing a recoil spring 36 against the top of the block 30. The lower end of the rod 32 is secured by an anchor 37 to the base 21. With this construction, upon the energization of the solenoid 26 the lever 22 is rotated in a clockwise direction, as viewed in Figure 3, and the lever 17 is rotated in a counter clockwise direction thereby raising the gate 9. When the solenoid 26 is de-energized the gate 9 falls thereby rotating the lever 22 in a counter-clockwise direction against the spring 36, which thereby serves as a recoil buffer for the gate 9.

The circuits for controlling the electromagnet 26 are shown in Figure 12. A supply circuit 38 provides electrical current for a controller 39 connected in series with the winding for the electromagnet 26 and a limit switch 40 connected to the ejector mechanism hereinafter described. By adjusting the position of the controller 39 the solenoid is energized provided the ejector mechanism is in its retracted position.

Due to the speed at which the strip is fed to the reel, which may equal 1000 feet per minute, it is necessary that the various feeding and coiling rollers hereinafter described are rotating at full speed before the gate 9 is opened.

As the strip moves along the chute 10, it is led into converging plates 41 mounted between side plates 42 and 44 mounted on the base 21 and constituting portions of a frame for the reel 8. The plates 41 direct the strip between an upper pinch roller 45 and a lower pinch roller 46 that feed the strip to the coiling rollers hereinafter described.

The upper pinch roller 45 is pivotally and resiliently mounted to permit a slight movement during the passage of the strip between it and the pinch roller 46 which is stationarily mounted. The pinch roller 45 is mounted on a shaft 47 carried by a pivotally mounted casting 48 positioned between the side plates 42 and 44. The casting 48 is supported at one end by a shaft 49 extending between the plates 42 and 44. The other end of the casting 48 is provided with pins 50 to which eye-bolts 51 are pivotally attached. The eye-bolts extend upwardly from the casting 48 through notches 52 formed in a cross member 54 of the reel frame. A conical collar 55 slidable on each bolt 51 seats in a co-operating notch 52 and a coil spring 56 is interposed between the collar 56 and an adjustable nut 57. The casting 48 is free to move up and down a short distance, its downward movement being cushioned by the spring 56. The eye-bolts 51, however, limit the amount of downward movement that the casting 48 may have. The casting 48 is urged in a downward direction by springs 58 carried by eye-bolts 59. The bolts 59 are connected to a bar 60 extending between the plates 42 and 44. The distance between the pinch rollers 45 and 46 is adjustable by means of the nuts 57 to provide for the feeding of strip material of different thicknesses. At the same time the upper pinch roller 45 is pressed against the strip material when it is fed between the rollers 45 and 46.

Since the pinch rollers 45 and 46 feed the strip to the coiling rollers, hereinafter described, they should be driven at a speed at least equal to, if not slightly in excess of, the speed at which the strip reaches the reel in order to avoid buckling of the strip at or near the reel and also in order to keep the strip under tension.

The shaft 47 for the upper pinch roller is connected by flexible couplings 61 and an intermediate shaft 62 to a driving motor 64 mounted on a pedestal 65 resting on the base 21. The shaft 66 of the pinch roller 46 is connected by a flexible coupling 67 to a driving motor 68 mounted on a cross beam 69. The cross beam 69 extends between the pedestal 65 and the plate 44. The motors 64 and 68 are electrically energized simultaneously with the motors for the coiling rollers hereinafter described. In operating the reel, these motors are set in operation and brought to full speed before the gate 9 is opened.

From the rollers 45 and 46 the strip is led between guiding plates 70 supported by the side plate 42. It is to be understood that the sizes and spacings of the plates 41 and 70 may be varied as desired in accordance with the width and thickness of the strip being coiled.

The strip, upon leaving the plates 70, is directed against the lower edge of a stationary coiling roller 71 mounted in front of the plate 42. A complementary stationary coiling roller 72 is mounted beneath the ends of the plate 70 to prevent the strip from engaging the latter. The stationary coiling rollers 71 and 72 are driven by motors 74 and 75 mounted directly on the rear of the side plate 44. Connecting shafts 76 extend through the space between the plates 42 and 44.

The coiling rollers 71 and 72 determine the position of the coil being formed in the reel by bearing against its upper surface and forcing the center of the coil to move downwardly as hereinafter described. As shown in the present application the strip moves in a clockwise direction while being coiled. Accordingly, all the coiling motors must be caused to rotate in a counter-clockwise direction.

Below the stationary coiling rollers 71 and 72, coiling rollers 77, 78, 79 and 80 are supported by levers 81, 82, 83 and 84, respectively. The levers 81, 82, 83 and 84 are mounted on shafts 85, 86, 87 and 88, respectively, extending between the plates 42 and 44. A guiding block 89 for the strip extends between the rollers 71 and 77. The guiding block 89 is supported by a shaft 91 extending between the plates 41 and 42. Supplementary guiding blocks 92, 93, 94 and 95 are carried at the ends of the levers 81, 82, 83 and 84, respectively, and beyond the rollers 71, 78, 79 and 80 so that when the rollers and guiding blocks are brought together as shown in Figure 4, they outline a circular opening beneath the rollers 71 and 72. It is in this opening that the coiling operation takes place.

The levers 81, 82, 83 and 84 are each constituted by a frame comprising longitudinally extending arms and a connecting portion constituting a hub for its shaft which extends between the plates 42 and 44. The effective lengths of the different levers vary in accordance with their relative positions about the circle defined by the several coiling rollers and the guide blocks.

Openings 96 are provided in the plates 42 and 44 in order that the shafts for the several coiling rollers 77, 78, 79 and 80 may extend to the rear of the plates and to their driving motors 97, 98, 99 and 100 which are supported from the rear sides of the levers 81, 82, 83 and 84. With this construction the driving motors are free to move with the coiling rollers as the latter expand during the coiling operation. This construction eliminates long driving shafts and the incidental couplings, such as are shown in the Johnson Patent No. 1,462,411. The several levers 81, 82, 83 and 84 are each provided with an adjustable spring 101 bearing against a block 102 mounted in a seat 104 in the reel frame. The springs 101 may be made in sections to prevent buckling if desired. Tie rods 105 extend through the springs 101 and terminate in threads 106 on which adjusting nuts 107 are mounted. The inner ends of the rods 105 are connected to arms 108 mounted on or connected to the different levers. The details of the exact shapes of the arms 108 vary slightly in accordance with the angular position of and the number of connections to any particular lever. However, the effect of all of the connections is to urge the coiling rollers mounted at the inner ends of each of the levers toward the center of the reel or the position shown in Figure 4.

As the strip is coiled the coiling rollers are moved outwardly against the resistance of the several springs 101. As the coiling rollers 71 and 72 are stationary the increase in thickness in the coil must be compensated for by movement of the rollers 77, 78, 79 and 80. This moves the center of the growing coil downwardly.

As soon as the strip is completely coiled the motors driving the coiling rollers 71, 72, 77, 78, 79 and 80 and those driving the pinch rollers 45 and 46 are stopped. Care should be taken to stop the rollers with the free outer end of the coil pointing downwardly. When the free end of the coil is pointing downwardly the tendency for the coil to unwind and thereby cause difficulty in later conveying it is eliminated.

When the coil comes to rest after being wound, it is supported only by the coiling rollers and is free from a supporting tube 109 extending outwardly from the plate 42 constituting a portion of the ejector mechanism. The supporting tube extends across the space between the plates 42 and 44 and terminates in the plate 44.

Spreading means is provided for moving the coiling rollers outwardly from the center of the coiling area during and after the coiling period. Provision is made for increasing the speed of the spreading means at the end of the coiling operation, for depositing the formed coil upon the supporting tube 109 and for returning the coiling rollers to their position shown in Figure 4, after the finished coil has been ejected. For spreading the coiling rollers a cam mechanism 110 is provided. The cam mechanism is connected to the several levers supporting the coiling rollers so that the levers are moved in opposition to the springs 101 by the cam mechanism.

Referring particularly to Figures 1, 6, 8, and 10, the cam mechanism 110 comprises a shaft 111 extending between the plates 42 and 44 and resting on bearings in the base 21. The shaft 111 supports keyed cams 112, 114 and 115, and is connected by a coupling 116 to a shaft 117 which, in turn, is connected to a shaft 118 extending outwardly from the gear train housing 119. The gear train in the housing 119 is varied in accordance with the speed at which it is desired to drive the shaft 111, which speed is determined by the speed of the strips being fed to the reel. A limit switch 120 having a plurality of contact members 120ᵃ and 120ᵇ mounted therein is driven from the gear train in the housing 119. The gear train in the housing 119 is actuated by a shaft 121 connected by a coupling 122 to a speed reducer 124. The shaft 125 of the speed reducer is connected by a coupling 126 to the shaft 127 of a motor 128. The motor 128 is provided with a magnetic brake 129 for preventing over-travel of the cams 112, 114 and 115.

A follower 130 controls the levers 81 and 82 carrying the coiling rollers 77 and 78, respectively. The follower 130 is mounted on a shaft 131. The shaft 131 is supported by links 132 rotatably mounted on a shaft 134 and by a second group of links 135. The shaft 134 extends between the plates 42 and 44. The links 135 are attached to a plate 136 connected to the shaft 86 for the lever 82. The plate 136 is in turn connected by links 137 to an arm 138 connected to the shaft 85 for the lever 81. Links 139 connect the arm 138 to an arm 140 carried by the shaft 91 for controlling the guide block 90.

The several connections between the links, plates and arms are constituted by pins extending through alined openings in the different members. Accordingly, as the cam 112 is rotated toward its high point the links 135 are moved upwardly thereby rotating the guide block 89, the lever 81 and the lever 82 in a counter-clockwise direction against the springs 101 attached to the levers 81 and 82. This moves the rollers 77 and 78 and their associated guide blocks 90, 92 and 93 outwardly away from the coil being wound. This movement is not dependent upon the movement of the rolls and guide blocks due to the expansion of the coil as the linkage mechanism can run ahead of the cams due to the expansion of the coil, if desired. The rotation of the cam shaft 111 is relatively slow during the winding period.

The lever 83 is actuated from the cam 114 through a follower 141 supported by brackets 142 constituting a part of the lever 83 and extending downwardly below its supporting shaft 87. The connection of the spring 101 to the arm 108 of the lever 83 is such as to urge the follower 141 into engagement with the cam 114. The outward movement of the roller 79 and the guide block 94 mounted on the lever 83 occur simultaneously with the outward movement of the rollers and guide blocks controlled by the cam 112.

Referring to Figure 10—a, the lever 84 is controlled by the cam 115 through a cam follower 144 mounted on a shaft carried at the ends of downwardly projecting arms 145. The links 145 are supported by a shaft 146 disposed above and at one side of the shaft 134. The arms 145, at a distance from the cam follower 144, are provided with stub shafts 146 to which links 147 are connected. The links 147 engage the outer end of the lever 84 and straddle the cam 115 as the arms 145 and lever 84 are mounted on opposite sides of the cam shaft 111.

Figure 7:
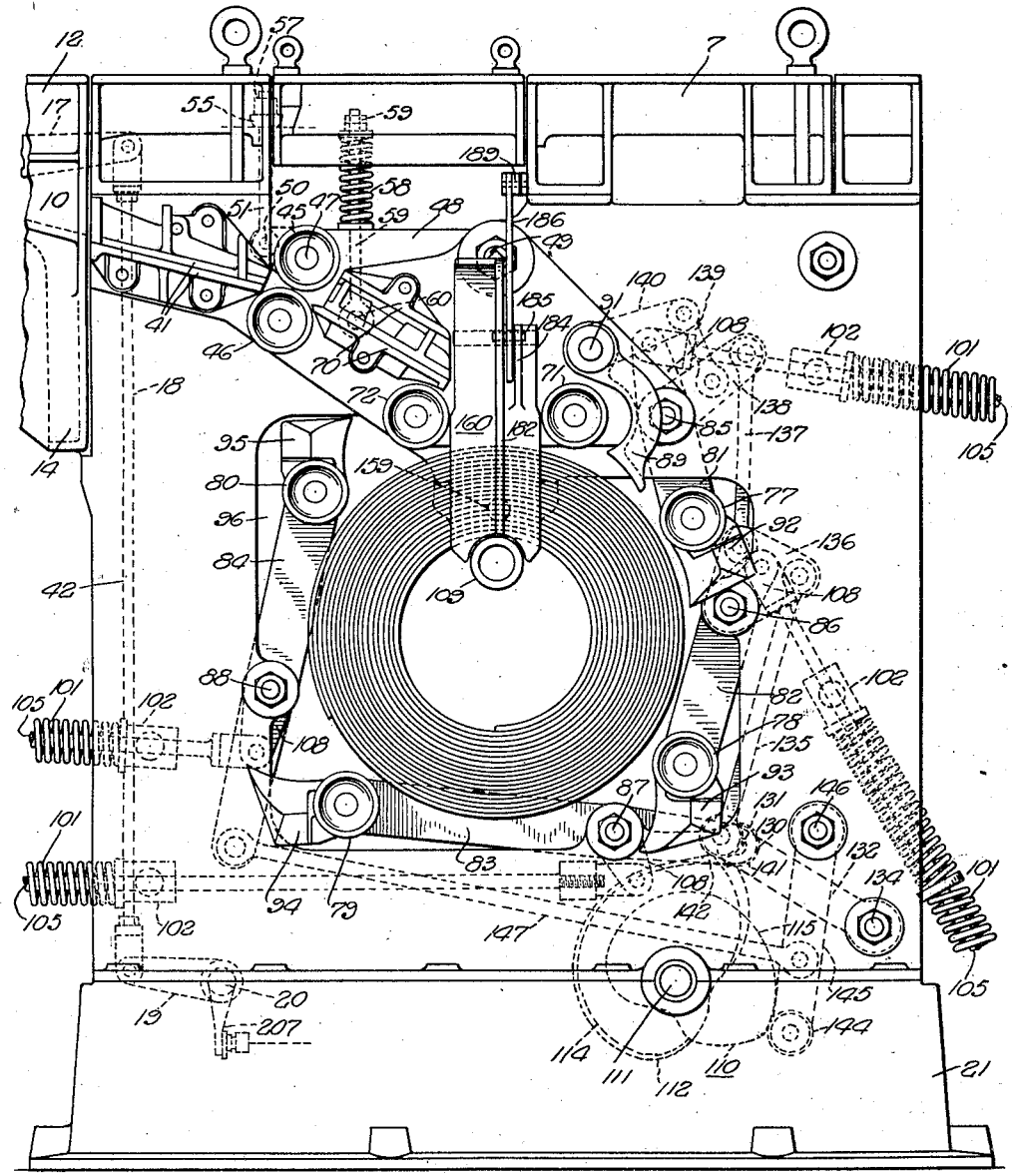
Figure 7 is an enlarged face view of the reel showing the positions of the different parts of the mechanism just prior to discharging the coil of strip.
Figure 8:
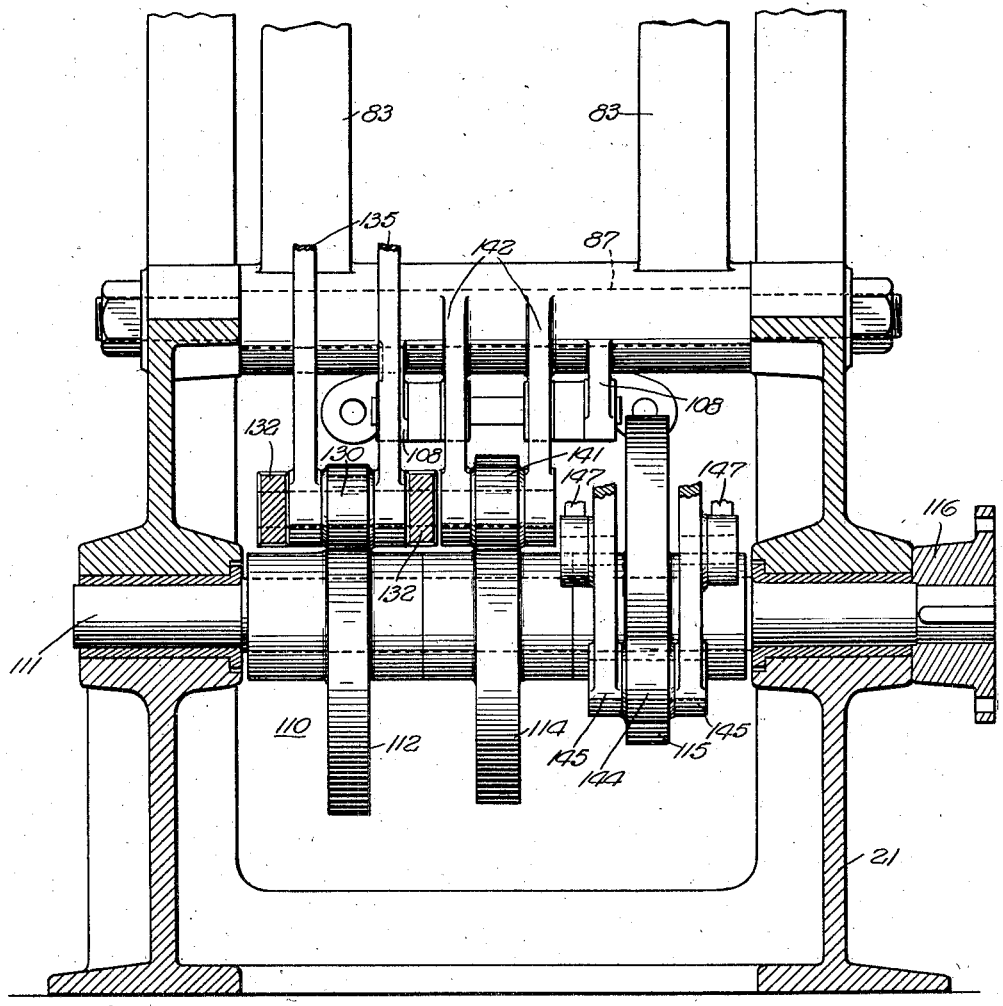
Figure 8 is an enlarged view, partially in elevation and partially in section, of a cam mechanism for positioning the coiling rollers.

The slow motion of the spreading mechanism controlled by the cam shaft 111 is continued while the coil is wound. After the rotation of the coiling rollers is stopped, the motor 128 is speeded up to expedite the spreading of the coiling rollers until the coil is lowered to rest upon the support 109, as shown in Figure 7. The spreading movement of the coiling rollers continues after the coil rests upon the support 109 in order that the rollers shall be free from the sides of the coil during the ejecting operation.

When the coiling rollers have been spread sufficiently far to permit of the finished coil freely passing between them, an ejector motor 148 is energized and its co-operating brake 149 is released. Control switches for the circuits of the motor 148 are contained in the limit switch housing 120 so that the ejector motor cannot be energized unless the coiling rollers are in their spread positions, as controlled by the motor 128. The rotation of the motor 148 is transmitted through a coupling 150 to a gear train mounted in a housing 151 from which a crank arm 152 extends. The crank arm 152 is connected by a link 154 to a lever 155. The lower end of the lever 155 is fulcrumed on the base 121 by a shaft 156 extending between walls formed in the base for supporting the motor 148. The upper end of the lever is connected by a link 157 and a flexible coupling 158 to the end of a push rod 159. The push rod 159 extends through bearings in the plates 42 and 44 and terminates in an ejector head 160, shown in detail in Figure 9.

The lever 155 carries a pointer 161 that controls the limit switch 40. The pointer 161 is rotatable about the pivot 162 connecting the lever 155 and the link 157, and is provided at its lower end with a slot 164 through which a screw 165 extends. The screw 165 is carried by the lever 155 and, by adjusting the position of the screw in the slot 164, the point of operation of the limit switch 140 is controlled.

Figure 5:
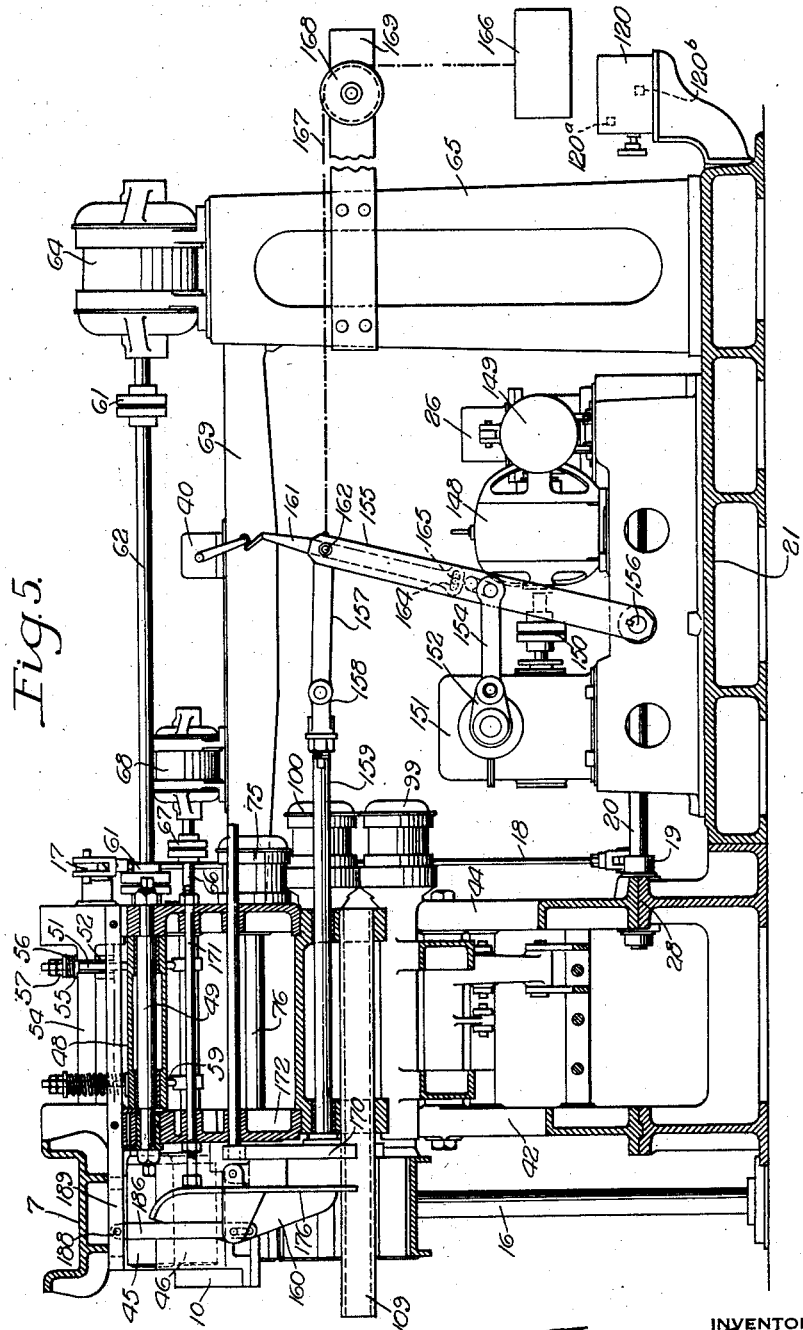
Figure 5 is a longitudinal sectional view of the reel taken substantially on the section line V—V shown in Figures 1 and 4.

Referring to Figure 5, for providing uniform motion of the lever 155 during the stroke of the crank arm 152, a counterweight 166 may be attached to the lever 155 opposite the shaft 162 by a cable 167. The cable 167 is supported by a pulley 168 supported by a bar 169 extending outwardly from the pedestal 65.

Figure 9:
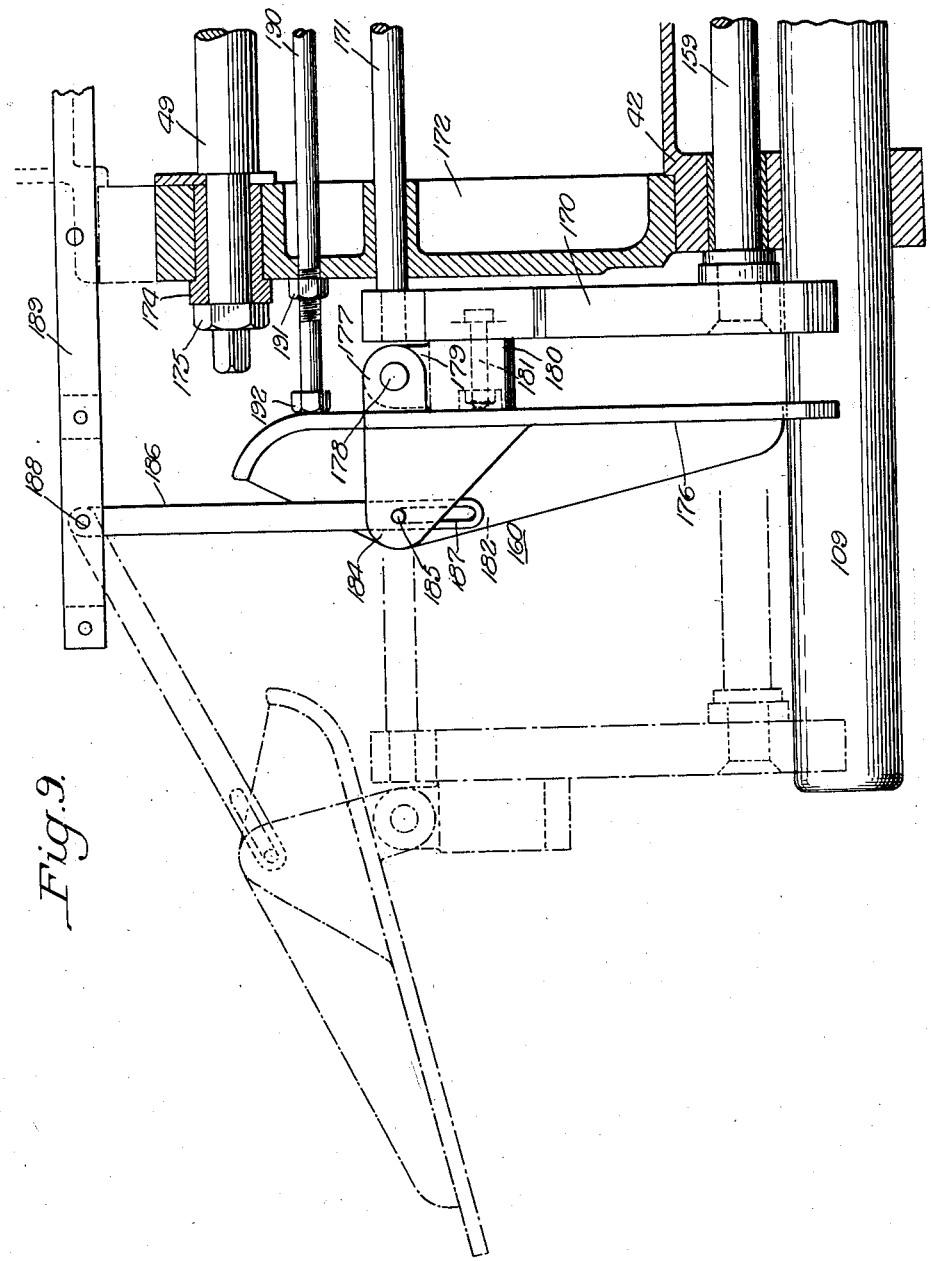
Figure 9 is a side view partially in elevation and partially in section of a portion of the ejector mechanism.

Referring to Figure 9, the ejector head 160 comprises a plate 170 that is connected near its lower edge with the outer end of the push rod 159. The upper end of the plate 170 is supported by a slide rod 171 extending through a casting 172 inserted in the plate 42. The casting 172 is secured in place by the end of shaft 49, a bushing 174, and a nut 175. The plate 170 is curved on its lower face to conform to the shape of the supporting tube 109 over which it slides.

Where the strip is so narrow that the coil is liable to skew or twist while being coiled, a supporting and guiding plate 176 is provided. The plate 176 is provided with ears 177 through which a pintle 178 extends for co-operation with a lug 179 carried by a spacing block 180. The block 180 is secured to the plate 170 by a bolt 181. The thickness of the block 180 may be varied in accordance with variations in the thickness of the strip being coiled. The plate 176 is also curved along its edge to overlie the upper surface of the supporting tube 109. The outer face of the plate 176 is provided with a rib 182 extending substantially the entire length thereof and a co-operating ear 184. A pin 185 extends through the ear 184 and rib 182.

To turn the plate 176 about the pintle 178, a link 186 having an elongated slot 187 at one end thereof, illustrated as the lower end, is connected between the pin 185 and a pin 188 carried by an arm 189 secured to the plate 82. An adjusting rod 190 extends through the plate 42 and engages the inner face of the plate 176 for determining the amount of rotation of the plate about the pintle 178 when the ejector head is in its retracted position. By adjusting a nut 191 threaded on the rod 190 the position of the rod head 192, which engages the plate 176, is varied. The position of the head 192 is normally such as to insure that the rear face of the plate 176 is parallel to the outer face of the plate 170, and spaced therefrom a distance slightly in excess of the thickness of the coil, when the ejector head 160 is in its retracted position.

As the head 160 is moved outwardly from the solid line position, shown in Figure 9, to the dotted line position, the plate 176 is moved from a vertical position to a position approaching the horizontal. The turning movement of the plate 176 is provided by the pin 185 engaging the end of the slot 187 and rotating the plate 176 about the pin 178. This turning movement lifts the plate 176 from in front of the coil to permit the latter to pass thereunder.

The guiding plates 70 feed the strip into the space between the plates 170 and 176 during the coiling operation. For wide strip the use of the plate 176 and its accessory parts may be eliminated.

In the operation of the reel, after the proper gear ratios have been arranged in the gear housing 119 and the resistances in circuit of the several motors have been arranged in accordance with the speed and thickness of the material being coiled, the operator first starts the motors 64, 68, 74, 75, 97, 98, 99 and 100. The circuits for starting the several motors are shown in Figure 11. A supply circuit 38 is connected by a conductor 194 to one side of a controller 195. The controller is connected by a conductor 196 to the armature of a motor 197. The other terminal of the motor is connected to the other conductor of the circuit 38 through a conductor 198. A field winding 199 and a resistor 200 are connected between the conductors 194 and 198 in parallel circuit to the controller 195 and the armature of the motor 197. The motor is connected by a shaft 201 to a generator 202, and an exciting winding 204 for the generator is connected by a circuit 205 to the supply circuit 38. The slip-rings 206 of the generator are connected by conductors to the slip-rings of the several motors 64, 68, 74, 75, 97, 98, 99 and 100. By varying the frequency of the current delivered by the generator 202 the speed of the several motors is varied.

The motors are first brought to full speed after which the controller 39, shown in Figure 12, is moved to energize the gate operating solenoid 26 provided that the limit switch 40 on the ejector is closed. The opening of the gate 9 in response to the energizing of the solenoid 26 closes a switch 207 connected to the charged roller 6 by a conductor 208, shown in Figures 4 and 13.

The switch 207 is connected by a conductor 209, a coil 210 on a relay 211, a conductor 212 and a contact member of the limit switch 120 to one terminal of a generator 214. The other terminal of the generator is provided with a ground connection 215. The generator 214 is driven from any suitable means, not shown.

As soon as the strip 2 completes the circuit between the grounded roller 4 and the charged roller 6, and the gate 9 is opened thereby closing the switch 207, and the coiling rollers are in position to close the limit switch 120, a circuit is completed for energizing the relay 211, preparatory to starting rotation of the cam motor 128. The completion of the foregoing circuit results in the energization of a time-limit relay 216. The details of the construction of the time-limit relay 216 do not constitute features of the present invention and hence are not described in full detail. There are several types of such relays on the market at the present time. Such relays generally comprise two electro-responsive systems indicated by the numerals 217 and 218. These systems cooperate to initiate the operation of the relay, cause the relay to operate to close a contact member, to maintain it closed for a definite period and then to open the contact member. The relay 216 is energized from a supply circuit 219, preferably supplying alternating current. The relay system 217 is connected to one of the conductors of the circuit 219 through a conductor 220, the system 217, a conductor 221, a terminal 222, a front contact member 224 of the relay 210 and a conductor 225 to the other conductor of the circuit 219.

The system 216 is connected by a conductor 226 to the same conductor 219 as the conductor 220. The other terminal of the system 218 is connected by a conductor 227 to the terminal 222.

Accordingly, upon the energization of the relay 211 the systems 217 and 218 of the time-element relay 216 are connected by external circuits to a supply circuit. This initiates the operation of the relay 216 which operation persists so long as the relay 211 remains energized. To prevent the relay 216 from becoming de-energized prematurely in case the circuit between the rollers 4 and 6 is broken by the end of the strip 2 passing thereover or in case the gate 9 is dropped to rest on top of the strip, thereby opening the switch 207, a circuit is provided from a terminal 228 on the conductor 209, through a conductor 229, a front contact 230 on the relay 216, a conductor 231, a front contactor 232 on the relay 211 and a conductor 234 to a ground connection 235. Accordingly, the contactor 230 on the relay 216 together with the contact 232 on the relay 211, when closed, control the energization of the relay 210 independently of the rollers 4 and 6 and the switch 207. The relay 216 is provided with a second front contactor 236. This contactor serves to initiate the movement of the cam motor 128 upon the operation of the time element relay 216.

The setting of the time-element relay 216 is sufficient to insure the coiling of the strip being fed to the reel and allow for a short space of time to elapse after the coiling operation is completed before the motor 128 is disconnected from the initiating circuits. After the strip is coiled and before the motor 128 is disconnected by the relay 216, the operator assumes control of the motor 128 through a controller 237 to speed up the motor for depositing the coil upon the support 109.

The controller 237 is diagrammatically illustrated as comprising three rows of contact members. The row to the right of Figure 13 controls the reverse movement of the motor; the row to the left controls the forward movement of the motor, and the intermediate row controls the connections to the motor and to the time-element relay 216.

The circuit for initiating the movement of the motor 128 is established with the contacts of the controller 237 in the neutral position, shown in Figure 13. The circuit extends from a conductor $L_1$ of the supply circuit 38 through the conductor 238, the contact 236, a conductor 239, a terminal 240 in the controller, a controller conductor 241, a terminal 242 in the controller, a conductor 244, a control cabinet or panel 245 containing secondary and reversing relays and resistors, a conductor 246, the armature of the motor 128, a conductor 247, a forward limit-switch $120^a$, a reverse limit-switch $120^b$, and a conductor 248 to the conductor L₂ of the supply circuit 38. The limit-switches 120ª and 120ᵇ prevent overtravel of the cam motor 128 in either direction.

As the circuits initiating the movements of the motor 128 are established as soon as the strip crosses the charged and grounded rollers, it follows that the motor 128 for operating the cam mechanism begins to function substantially simultaneously with the initiating of the coiling operation. As the coiling operation proceeds, the coiling rollers and associated guiding blocks are spread by the movement of the several cams 112, 114 and 115. This spreading movement continues at a rate of speed depending upon the characteristics of the material being coiled. At the end of the coiling operation the controller 195 is moved to its neutral position, thereby stopping the coiling rollers.

At the same time the controller 39 is moved to its neutral position to lower the gate 9. By moving the controller 237 to the right as shown by the forward arrow, a terminal 249 connected by a conductor 250 to the conductor L₁ of the supply circuit 38 is brought into engagement with the terminal 240, thereby shunt circuiting the relay 216 with reference to the control of the motor 128. This may be done at any time in the operation of the motor 128. The forward movement of the controller connects a terminal 251 connected to the conductor 250 to a terminal 252. The terminal 252 is connected by a conductor 254, a winding 255 of a relay 256, and a conductor 257 to the conductor L₂ of the circuit 38. The relay 256 controls the operation of certain direction-controlling relays mounted in the panel 245. As the details of the direction-controlling relays, the resistors and their electrical connections are complicated and are not claimed as novel in the present application, and as such devices and connections are common in the motor control art, a detailed description thereof has been omitted from the present application. The relay 256 is provided with contactors 258 and 259 for controlling circuits extending into the cabinet 245. Upon the energization of the relay 256, the connections of the resistors, relays and contactors for the motor 128 are so altered that the motor 128 operates at a higher speed. This higher speed permits the cams to spread the coiling rollers more rapidly than is done during the coiling operation. As the period during which the coiling rollers are moved away from the finished coil is unproductive motion, the efficiency of the reel is improved by cutting down the time during which such unproductive motion takes place.

After the finished coil is ejected from the reel, the operator reverses the position of the handle of the controller 237 for returning the coiling rollers to the positions shown in Figure 4. This operation requires a reversal of the direction of rotation of the motor 128. Reverse movement of the controller 237 breaks the engagement between the terminal 242 and the conductor 244 thereby opening the circuits controlling the forward rotational movement of the motor. The relay 256 is also de-energized. A terminal 260 connected to the conductor 250 is brought into engagement with a terminal 261 by which a conductor 262 leading to the cabinet 245 is electrically energized. At the same time, a terminal 264 is brought into engagement with the terminal 252, thereby energizing the relay 256. The different connections made between the conductors 244 and 262 through the medium of the relay 256 and the mechanism in the cabinet 245 control the different speeds of the forward direction of rotation of the motor as well as the rotation in the reverse direction. The connections of a field winding 265 for the motor 128 are controlled through the cabinet 245.

The circuits for controlling the ejector motor 148 are diagrammatically illustrated in Figure 14. A controller 266 is connected to the supply circuit 38 by a conductor 267, a conductor 268, a cabinet 269 for reversing and relay mechanism, a conductor 270, the armature of the motor 148, a conductor 272, a contact of the ejector limit switch 40, and a conductor 274 to the other side of the supply circuit 38. A second conductor 275 connects the controller 266 and the cabinet 269 in order that the motor 148 may be reversed. A field winding 276 for the motor 148 is controlled from the cabinet 269.

With the foregoing mechanical construction and electrical connections the entire operation of the reel is controlled by a single operator having before him the controllers 39, 195, 237 and 266.

While we have shown and described the present preferred embodiment of our invention, it is to be understood that it may be otherwise embodied without departing from the spirit and scope of the appended claims.

We claim:

1. A reel comprising a plurality of coiling rollers, means for driving the rollers, mountings for the rollers, resilient means for permitting shifting the positions of certain of the roller mountings in accordance with the diameter of a coil of material formed therebetween, a plurality of cams rotatably supported adjacent said rollers and followers engaging said cams and connected to said mountings for shifting the positions of the rollers independently of the coil formed therebetween.

2. A reel comprising a plurality of coiling rollers, means for driving the rollers, mountings for the rollers, and means for shifting the positions of the rollers during the coiling operation independently of the reactions between the rollers and the coil formed therebetween, including a motor in a circuit controlled by the entry of material into the reel.

3. A reel comprising a plurality of movable coiling rollers, means for driving the rollers, mountings for the rollers, means for permitting the shifting of the positions of the roller mountings in accordance with the diameter of a coil of material formed therebetween, and a cam having a follower connected to said mountings for shifting the positions of the roller mountings independently of the coil formed therebetween.

4. A reel comprising a plurality of movable coiling rollers, means for driving the rollers, mountings for the rollers, means for permitting the shifting of the roller mountings in accordance with the diameter of a coil of material formed therebetween, mechanism for shifting the positions of the rollers independently of the coil formed therebetween, and means for driving said mechanism at different speeds, including a motor and change-speed gear.

5. A reel comprising a plurality of movable coiling rollers, means for driving the rollers, mountings for the rollers, means for permitting the shifting of the roller mountings in accordance with the diameter of a coil of material formed therebetween, cam mechanism for shifting the positions of the rollers independently of the coil formed therebetween, and means for driving the cam mechanism at different speeds.

6. A reel comprising a frame, coiling rollers mounted therein, supporting means for the coiling rollers, means permitting relative movement between the coiling rollers while coiling material, and means comprising linkage mechanisms connected to the several supporting means for the rollers, and cams having followers connected to said linkages, for moving the rollers independently of the pressures exerted thereon by a coil mounted therebetween.

7. A reel comprising a frame, coiling rollers mounted therein, supporting arms for the coiling rollers, means for driving the coiling rollers, means permitting relative movement between the coiling rollers during the formation of a coil of material, means comprising a cam mechanism and connecting means between the cam mechanism and supporting arms for varying the positions of the coiling rollers, and means for actuating the cam mechanism.

8. A reel comprising a plurality of coiling rollers, supported means for the rollers, actuating means for the rollers, a fixed integral coil support mounted intermediate said rollers and located so that the material being coiled is supported out of engagement therewith on said rollers, and means for separating the coiling rollers after a coil is formed therebetween for depositing the coil on said support.

9. A reel comprising a plurality of coiling rollers, supporting means for the rollers, actuating means for the rollers, a fixed integral coil support mounted intermediate said rollers and located so that the material being coiled is supported out of engagement therewith on said rollers, and means for discharging the coil from the support.

10. A reel comprising a plurality of rotatable coiling rollers, means for spreading the coiling rollers, and means for initiating the movement of the spreading means in response to movement of material to the reel and independently of the coil being formed.

11. A reel comprising a plurality of rotatable coiling rollers, means for spreading the coiling rollers, and means for controlling the movement of the spreading means in response to the movement of material to the reel and independently of the coil being formed.

12. A reel comprising a plurality of rotatable coiling rollers, means for spreading the coiling rollers, means for initiating the movement of the spreading means in accordance with the movement of material to the reel, and means for changing the rate of movement of the spreading means after the initiation of such movement.

13. A reel comprising a plurality of rotatable coiling rollers, means for spreading the coiling rollers, means for initiating movement of the spreading means in accordance with the movement of material for the reel, and means for changing the speed of the spreading means upon the completion of a coiling operation by said rollers.

14. A reel comprising a plurality of rollers for entirely supporting and forming a coil, a fixed integral support for the finished coil projecting therethrough but out of engagement therewith, and means for creating relative movement between the rollers for depositing the finished coil on said support.

15. A reel comprising a plurality of coiling rollers for entirely supporting and forming a coil, means for discharging a formed coil from the reel including a fixed, integral arm free from the coil during the formation thereof, and means for creating relative movement between the rollers for depositing the formed coil on the discharge means.

16. Reeling mechanism comprising a plurality of coiling rollers, actuating means for the rollers, a fixed, integral arm mounted intermediate said coiling rollers and out of engagement with the coil being formed, and means for causing the separation of the coiling rollers at one speed during a coiling operation and at another speed subsequent to the coiling operation for depositing the formed coil upon said arm.

17. Reeling mechanism comprising a plurality of coiling rollers, actuating means for the rollers, a fixed, integral arm mounted intermediate said coiling rollers, said rollers being adapted to support a coil free of said mandrel while the coil is being formed, means for causing the separation of the coiling rollers at one speed during a coiling operation and at another speed subsequent to the coiling operation for depositing the formed coil upon said arm, and means for discharging the formed coil from the arm.

18. Reeling mechanism comprising a plurality of coiling rollers, actuating means for the rollers, a fixed, integral arm mounted intermediate said coiling rollers, means for controlling the separation of the coiling rollers at one speed during a coiling operation and at another speed subsequent to the coiling operation for depositing the formed coil upon said arm, means for discharging the formed coil from the arm, said controlling means having provision for returning the rollers after the discharge of the coil.

19. A reel comprising a plurality of stationary coiling rollers, a plurality of movable coiling rollers co-operating therewith and a support for a formed coil mounted intermediate said rollers and out of engagement with said coil, whereby upon the formation of a coil between said rollers said stationary rollers exert pressure on the coil to position its center relative to said support.

20. A coiling device including an integral arm, coiling rollers disposed about said mandrel, feed rolls for supplying material to said coiling rollers whereby a coil of material is formed about said arm but out of engagement therewith.

21. A coiling device including a fixed, integral arm, coiling rollers disposed thereabout for receiving material, forming a coil thereof around said arm, and supporting said coil independently of said arm.

22. In a coiling device, a fixed, integral arm, coiling rollers thereabout for receiving material and forming a coil thereof around said arm and free therefrom.

23. Reel mechanism comprising a coiling mechanism, a gate for supplying material to the coiling mechanism, an electrical circuit controlled by said gate, conducting rollers and an electrically responsive mechanism associated with said circuit whereby upon the completion of the circuit between said rollers through a body of material traversing said rollers and the opening of said gate, said electrically responsive mechanism is actuated.

24. A reel having a runway for strip material, a gate positioned in said runway, a switch controlled in accordance with the movement of said gate, conducting rollers co-operating with said runway and an electrically actuated device controlled by a circuit including said rollers and switch.

25. Reeling mechanism comprising a plurality of coiling rollers, means for supplying material to the coiling rollers including a plurality of conducting rollers, a gate, a switch controlled in accordance with the movement of said gate, and means for spreading said coiling rollers, said spreading means having a motor controlled by said rollers and switch.

26. A reel comprising a plurality of movable coiling rollers, means for driving the rollers, mountings for the rollers and means initiated by the entry of material into the reel and independent of the coil as formed for continuously shifting the positions of the roller mountings during a period when material being coiled is supplied to the rollers.

27. A reel comprising a plurality of movable coiling rollers, means for driving the rollers, movable mountings for the rollers, means for permitting the movement of the rollers in accordance with the diameter of a coil of material formed therebetween, and mechanism initiated by the introduction of the material to be coiled and independent of the coil diameter for moving the rollers away from the outer surface of the coil formed therebetween.

28. A reel including a support for coiled material, a plate on one side of the coil movable longitudinally of the support, a second plate on the other side of the coil pivoted to the first plate for longitudinal movement therewith for a portion of its travel and for rotary movement relative thereto during another portion of its travel and pusher means for actuating said plates.

29. Strip-coiling apparatus including a discharge device for coiled strip comprising a support, a member movable longitudinally of the support, and a second member pivotally mounted thereon for movement in substantial parallelism with the first member during a portion of its movement and means for rotating the second member relative thereto during another portion of its movement.

30. Strip-coiling apparatus including a discharge mechanism for coils of strip comprising a support, a member movable longitudinally of the support and carrying a second member pivotally connected thereto, and means for causing rotation of the second member after a predetermined amount of travel thereof.

31. In a strip-coiling apparatus, a discharge device for coils of strip comprising a support, means for removing material from said support comprising a pair of members movable relatively to the support and to each other, one of said members pivotally supporting the other, and anchoring means for said pivotally mounted member, said anchoring means having a lost motion connection with said pivotally mounted member whereby after a definite amount of movement relative to said support said pivotally mounted member is caused to rotate for discharging material from the support.

32. The combination with a machine for coiling metal strips including a plurality of adjustable coil forming elements, of a motor for operating said elements and control means for said motor including means controlled by the strip material for starting said motor and means for automatically stopping said motor after a predetermined degree of operation thereof.

33. The combination with a machine for coiling metal strips, including a plurality of associated coil forming elements normally in a given retracted position and requiring operation through a given range during a coiling operation, of a driving motor for said elements, means under the control of the strip material for automatically starting said motor when said coil forming elements are in their retracted position and for automatically stopping said motor upon movement of said coil forming elements through said given range and manual means for controlling said motor to return said coil forming elements to normal position.

34. The combination with a machine for coiling metal strips, said machine including a plurality of adjustable coil forming elements, of a normally closed gate associated with said machine and adapted when opened to cause the strip material to enter said machine, a driving motor for said coil forming elements, control means for said motor controlled by the strip material to effect starting of said motor, said control means being operative only upon opening of said gate.

35. The combination with a machine for coiling metal strips, said machine including a plurality of adjustable coil forming elements and an ejector normally in a given position and operable to eject the coil of material from the machine, of a normally closed gate associated with said machine and adapted when opened to direct the forward end of a strip of material into said machine, a driving motor for said coil forming elements, and control means for said motor including means controlled by the strip material for starting said motor, said latter means being effective only upon opening of said gate and positioning of said ejector in normal position.

36. A reel comprising a plurality of coiling rollers, movable supports for said rollers, a variable speed motor carried by each of said supports for driving said rollers, means for permitting shifting of the roller supports in accordance with the diameter of a coil of material formed therebetween, mechanism for shifting the positions of the roller supports independently of the coil formed therebetween, and means for driving said mechanism at different speeds including a variable speed rotary motor and speed reducing gears.

In testimony whereof we have hereunto set our hands.

FLORENCE C. BIGGERT, JR.
LANE JOHNSON
HOWARD H. TALBOT.